United States Patent
Mossoba et al.

(10) Patent No.: US 10,977,626 B2
(45) Date of Patent: Apr. 13, 2021

(54) SEMI-PRIVATE BLOCKCHAIN VIRTUAL CURRENCY EXCHANGE SYSTEMS

(71) Applicant: Capital One Services, LLC, McLean, VA (US)

(72) Inventors: Michael Mossoba, Arlington, VA (US); Joshua Edwards, Philadelphia, PA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 18 days.

(21) Appl. No.: 16/008,606

(22) Filed: Jun. 14, 2018

(65) Prior Publication Data
US 2019/0385130 A1 Dec. 19, 2019

(51) Int. Cl.
*G06Q 20/06* (2012.01)
*G06Q 20/40* (2012.01)
(Continued)

(52) U.S. Cl.
CPC .......... *G06Q 20/065* (2013.01); *G06Q 20/02* (2013.01); *G06Q 20/06* (2013.01); *G06Q 20/10* (2013.01);
(Continued)

(58) Field of Classification Search
CPC .... G06Q 20/065; G06Q 20/10; G06Q 20/401; G06Q 30/0215; G06Q 30/0217;
(Continued)

(56) References Cited

U.S. PATENT DOCUMENTS 9,940,609 B2 * 4/2018 Brennan ............... G06Q 20/108
10,762,506 B1 * 9/2020 Cash .................. G06K 9/00087
(Continued)

FOREIGN PATENT DOCUMENTS

WO 2017136956 A1 8/2017

OTHER PUBLICATIONS

"A basic dictionary of blockchain: 10 terms you should know"; Nov. 10, 2017; document 'A basic dictionary of blockchain.pdf' (Year: 2017).*

(Continued)

*Primary Examiner* — Patrick McAtee
*Assistant Examiner* — Edgar R Martinez-Hernandez
(74) *Attorney, Agent, or Firm* — Troutman Pepper Hamilton Sanders LLP; Christopher J. Forstner; John A. Morrissett

(57) ABSTRACT

A first merchant node on a semi-private blockchain virtual currency exchange system is exclusively capable of creating first virtual currency units. Unaffiliated merchant node(s) are exclusively capable of creating other merchant-specific virtual currency units in the system, while customer computing devices are incapable of creating virtual currency units. The first merchant node creates and issues first virtual currency units to a first customer account associated with a first customer computing device. Upon receiving a transaction request for exchanging first virtual currency unit(s) for a second currency type between the first customer account and another customer account, the first merchant node validates the first transaction request, and creates and sends a first transaction receipt to unaffiliated merchant node(s). Upon receiving a redemption request from a customer account, the first merchant node validates the first redemption request, and creates and sends a first redemption receipt to unaffiliated merchant node(s).

19 Claims, 7 Drawing Sheets

(51) Int. Cl.
*G06Q 20/32* (2012.01)
*G06Q 20/10* (2012.01)
*G06Q 20/02* (2012.01)
*H04L 9/06* (2006.01)
*G06Q 30/02* (2012.01)

(52) U.S. Cl.
CPC ......... *G06Q 20/3224* (2013.01); *G06Q 20/40* (2013.01); *G06Q 20/401* (2013.01); *G06Q 20/4015* (2020.05); *G06Q 30/0226* (2013.01); *H04L 9/0637* (2013.01); *G06Q 2220/00* (2013.01)

(58) Field of Classification Search
CPC ........... G06Q 30/0236; G06Q 20/3224; G06Q 20/40; G06Q 20/4015; H04L 9/0637
USPC .......................................................... 705/79
See application file for complete search history.

(56) References Cited

U.S. PATENT DOCUMENTS

| | | | |
|---|---|---|---|
| 2003/0037233 | A1 | 2/2003 | Pearson |
| 2007/0038515 | A1* | 2/2007 | Postrel ................. G06Q 20/06 705/14.3 |
| 2014/0365295 | A1* | 12/2014 | Postrel ................. G06Q 30/02 705/14.33 |
| 2015/0112781 | A1* | 4/2015 | Clark ................. G06Q 30/0234 705/14.17 |
| 2015/0170112 | A1 | 6/2015 | DeCastro |
| 2016/0330034 | A1 | 11/2016 | Back et al. |
| 2016/0379256 | A1 | 12/2016 | Salamon et al. |
| 2017/0053249 | A1 | 2/2017 | Tunnell et al. |
| 2017/0076330 | A1* | 3/2017 | Proctor, Jr. .......... G06Q 20/223 |
| 2017/0091765 | A1* | 3/2017 | Lloyd ................. G06Q 20/321 |
| 2017/0140408 | A1* | 5/2017 | Wuehler ............ G06Q 30/0207 |
| 2017/0161734 | A1 | 6/2017 | Bankston et al. |
| 2017/0243241 | A1 | 8/2017 | Boutelle et al. |
| 2017/0286951 | A1* | 10/2017 | Ignatchenko ........ G06Q 20/401 |
| 2017/0345038 | A1* | 11/2017 | Kenney ............. G06Q 30/0215 |
| 2017/0357966 | A1* | 12/2017 | Chandrasekhar .. G06Q 20/3829 |
| 2017/0372308 | A1* | 12/2017 | Metnick ............. G06Q 20/3829 |
| 2018/0062831 | A1* | 3/2018 | Zhang .................. H04L 9/3297 |
| 2018/0075453 | A1* | 3/2018 | Durvasula ............ G06Q 20/389 |
| 2018/0082294 | A1* | 3/2018 | Davis ................. G06Q 20/3674 |
| 2018/0089651 | A9* | 3/2018 | Lund ........................ G06F 21/00 |
| 2018/0102013 | A1* | 4/2018 | Spanos ...................... H04L 9/14 |
| 2018/0121673 | A1* | 5/2018 | Goldfarb ............. G06F 21/6218 |
| 2018/0136633 | A1* | 5/2018 | Small .................... G06Q 20/065 |
| 2018/0176017 | A1* | 6/2018 | Rodriguez .......... H04L 63/0838 |
| 2018/0225660 | A1* | 8/2018 | Chapman ............. G06Q 20/401 |
| 2018/0225693 | A1* | 8/2018 | Postrel .................... G06Q 50/01 |
| 2018/0268401 | A1* | 9/2018 | Ortiz .................... G06Q 20/204 |
| 2019/0073666 | A1* | 3/2019 | Ortiz .................. G06Q 30/0207 |
| 2019/0108542 | A1* | 4/2019 | Durvasula ............. H04L 9/3297 |

OTHER PUBLICATIONS

Blockchain Intellectual Property Council, an initiative of the Chamber of Digital Commerce; "An Introduction to Blockchain Technology"; Jul. 11, 2017; document 'An Introduction to Blockchain Technology.pdf' (Year: 2017).*

An IP.com Prior Art Database Technical Disclosure; "System and Method to discover and install applications related to a product at point of sale"; Jul. 2, 2014; document 'Discover and Install Applications Related to a Product at Point-of-Sale.pdf' (Year: 2014).*

"Making blockchain real for customer loyalty rewards programs," Deloitte; Oct. 12, 2016 (20 pages).

Extended European Search Report in related EP Application No. 19180408.7, dated Nov. 20, 2019.

\* cited by examiner

SEMI-PRIVATE BLOCKCHAIN VIRTUAL CURRENCY EXCHANGE SYSTEMS

FIELD

This disclosed technology relates to semi-private blockchain virtual currency exchange systems, and more specifically to semi-private blockchain virtual currency exchange systems having merchant nodes exclusively capable of creating merchant-specific virtual currency units.

BACKGROUND

Merchants often provide rewards points, discounts, promotions, etc. to customers in order to incentivize customers to return for repeat purchases (e.g., buying five cups of coffee to receive a free sixth cup). These rewards may be attractive to "regular" customers who frequently patron a particular merchant but are less effective for those who only make infrequent visits. Often, customers obtain rewards from a merchant that they are unlikely to redeem (e.g., because they live in an area that lacks a physical store for that merchant, they prefer another merchant, they do not need a particular volume of a product, etc.) and are unable to benefit from the rewards by exchanging the reward with another customer who would like to redeem it.

Some merchants (e.g., credit card issuers, airlines, etc.) allow customers to exchange one type of their rewards points for another type of their rewards points or rewards points for an affiliated partner (e.g., credit card points in exchange for air mileage points with an affiliated partner, air mileage points in exchange for those of an affiliated partner airline, etc.), but such exchanges are limited to certain types of rewards points and partnerships between merchants, both of which are determined by the merchants. Instead, many customers may prefer to exchange rewards points for those affiliated with any merchant of their choosing, regardless of merchant partnerships or type of rewards points. Other existing Internet-based marketplaces allow customers to exchange rewards points for cash or freely barter any property, but typically either charge a substantial fee to facilitate the exchange for cash or are unregulated and present security and authenticity risks.

To more freely and securely facilitate transactions and exchanges involving rewards points, some systems have turned to so-called distributed "blockchain" systems that can simultaneously record transaction-related entries in multiple places, and simultaneously. Unlike traditional centralized ledgers, which typically rely on a central authority to validate the authenticity of transactions recorded in the database and make the system susceptible to lost information, tampering, validation delays, etc., such blockchain systems typically have no centralized data store. Instead, transactions are bundled into blocks that are chained together and then broadcasted to other nodes in the network. Different types of blockchain systems restrict who is allowed to particulate in the system and maintain the shared ledger. For example, public blockchain systems (e.g., Bitcoin) have no participant restrictions but typically require substantial computational power to maintain a ledger on a large scale and provide little privacy and security. Conversely, private and semi-private blockchain systems restrict what entities are authorized to participate in writing to the distributed ledger. While helpful, existing blockchain systems struggle to provide appropriate control and flexibility in a manner that provides widespread access to customers and merchants wishing to participate, ensures the authenticity of rewards points, securely and cost-efficiently facilitates transactions, and avoids overloading the computational power of the system.

Accordingly, the disclosed semi-private blockchain virtual currency exchange systems and methods are directed to these and other considerations.

BRIEF SUMMARY

The disclosed technology is directed to a merchant node among a plurality of merchant nodes on a semi-private blockchain virtual currency exchange system. The plurality of merchant nodes may include one or more merchant nodes associated with a first merchant (i.e., "first merchant nodes") and exclusively capable of creating virtual currency units corresponding to the first merchant (i.e., "first virtual currency units"). The plurality of merchant nodes may also include one or more merchant nodes associated with a second, unaffiliated merchant (i.e., "second merchant nodes" or "unaffiliated merchant nodes") and exclusively capable of creating another type of merchant specific virtual currency units (i.e., "second virtual currency units"). Each merchant node may include one or more processors and a memory in communication with the one or more processors that stores instructions that, when executed, cause the merchant node to perform one or more steps of method(s) disclosed herein.

In some exemplary embodiments, the first merchant node may be configured to create a plurality of first virtual currency units and issue one or more of the first virtual currency units to a first customer account. Each customer account may be associated with a customer computing device connected to the system and, unlike the merchant nodes, the customer computing devices are unable to create any type of virtual currency units within the system. The first merchant node may receive a transaction request for exchanging one or more of the first virtual currency units for a second currency type (e.g., second virtual currency units, generic virtual currency units, U.S. dollars, etc.) between the first customer account and a second customer account. Responsive to the transaction request, the first merchant node may validate the transaction request and create a transaction receipt after the transaction request has been validated. The first merchant node may then send the transaction receipt to one or more of the unaffiliated merchant nodes (e.g., the second merchant nodes and/or third, fourth, fifth, etc. merchant nodes) in order to store and record the transaction receipt on the system.

In other exemplary embodiments, the first merchant node may receive, from a point-of-sale (POS) terminal associated with the first merchant, a redemption request to redeem one or more of the first virtual currency units from a customer account (e.g., the first, second, third, etc. customer account). In response, the first merchant node may validate the redemption request and create a redemption receipt after the redemption request is validated. The first merchant node may then send the redemption receipt to one or more of the unaffiliated merchant nodes in order to store and record the redemption receipt on the system.

Certain implementations of the disclosed technology include a semi-private distributed ledger system that may provide a flexible, efficient, and secure means to issue, exchange, and redeem virtual currencies, rewards, loyalty points, and the like.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
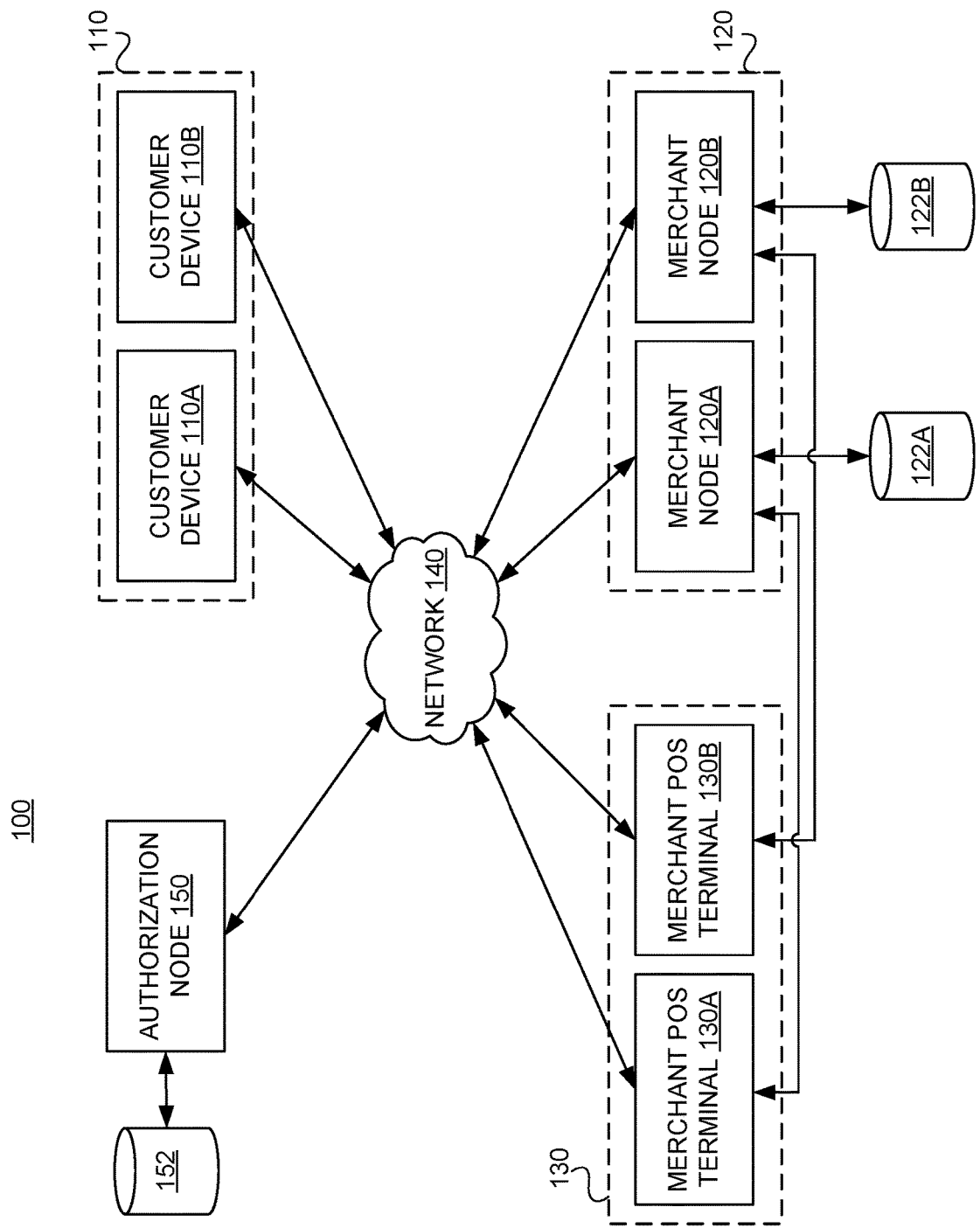
FIG. 1 is a system diagram a semi-private blockchain virtual currency exchange system in accordance with some exemplary embodiments.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

According to one aspect of the disclosed technology, a first merchant node on a semi-private blockchain virtual currency exchange system is disclosed. The first merchant node may be associated with a first merchant and exclusively capable of creating first virtual currency units within the system. One or more unaffiliated merchant nodes may be associated with an unaffiliated merchant and exclusively capable of creating another type of merchant-specific virtual currency units within the system. The first merchant node may include one or more processors and a memory in communication with the processors and storing instructions that, when executed by the processors, are configured to cause the first merchant node to perform steps of a method. The first merchant node may create a plurality of first virtual currency units and issue one or more of the first virtual currency units to a first customer account associated with a first customer computing device. Each customer computing device within the system may be incapable of creating any type of virtual currency units within the system. The first merchant node may receive a first transaction request for exchanging one or more of first virtual currency units for second currency type between the first customer account and a second customer account associated with a second customer computing device. In response, the first merchant node may validate the first transaction request, create a first transaction receipt after the first transaction request has been validated, and send the first transaction receipt to one or more of the unaffiliated merchant nodes for storage to record the first transaction receipt within the system. The first merchant node may receive, from a point-of-sale (POS) terminal associated with the first merchant, a first redemption request to redeem one or more of the first virtual currency units from one of the first customer account, the second customer account, or a third customer account associated with a third customer computing device. In response, the first merchant node may validate the first redemption request, create a first redemption receipt after the first redemption request has been validated, and send the first redemption receipt to one or more of the unaffiliated merchant nodes for storage to record the first redemption receipt within the system.

In some embodiments, the first virtual currency units may include rewards credits that are exclusively redeemable from the first merchant. The second currency type may include one or more second virtual currency units (e.g., rewards credits that are exclusively redeemable from the second merchant) that are exclusively created by the second merchant node of the one or more unaffiliated merchant nodes.

In some embodiments, issuing one or more of the first virtual currency units to the first customer account may include validating the issuance, creating an issuance receipt after the issuance has been validated, and sending the issuance receipt to one or more of the unaffiliated merchant nodes for storage to record the issuance receipt within the system. In other embodiments, issuing one or more of the first virtual currency units to the first customer account may include receiving a virtual currency issue request for the first customer account when the first computing device is located proximate the POS terminal associated with the first merchant, and issuing (e.g., by the merchant node or via the POS terminal or another device at the direction of the merchant node) one or more of the first virtual currency units to the first customer account while the first computing device is located proximate the POS terminal.

In further embodiments, sending the first transaction receipt to one or more of the unaffiliated merchant nodes may include sending the one or more of the first transaction receipt to a randomly-selected first plurality of the unaffiliated merchant nodes. Additionally, sending the first redemption receipt to one or more of the unaffiliated merchant nodes may include sending the one or more of the first transaction receipt to a randomly-selected second plurality of the unaffiliated merchant nodes that differs from the first plurality of the unaffiliated merchant nodes.

In some embodiments, validating the first transaction may include receiving a notification of successful verification by the first customer computing device based on a first customer public key associated with the first customer computing device and a first customer private key known only to the first customer computing device, comparing a purported first merchant private key known only to the first merchant node and associated with a first merchant public key with a stored first merchant private key, and validating the first transaction based on the received notification and the comparison.

In further embodiments, the first merchant node may also be configured to receive a second transaction receipt from one or more of the unaffiliated merchant nodes for storage to record the second transaction receipt within the system.

According to another aspect of the disclosed technology, a semi-private blockchain virtual currency exchange system is disclosed. The system may include one or more processors and a memory in communication with the one or more processors and storing instructions that, when executed by the one or more processors, are configured to cause the system to perform steps of a method. The system may generate, by a first merchant node within the system, a plurality of first virtual currency units. The first merchant node may be associated with a first merchant. The system may issue, by the first merchant node, one or more of the first virtual currency units to a first customer account associated with a first customer computing device of a plurality of customer computing devices within the system. Each of the plurality of customer computing devices may be incapable of generating first virtual currency units or second virtual currency units. The system may receive, at the first merchant node, a first transaction request for transferring one or more of first virtual currency units from the first customer account to a second customer account associated with a second customer computing device of the plurality of customer computing devices within the system. In response, the system may validate, at the first merchant node, the first transaction request and generate, at the first merchant node, a first transaction receipt after the first transaction request has been validated. The system may transmit the first transaction receipt to at least a second merchant node on the system for storage to update a record of first virtual currency transactions within the system. The second merchant node may be associated with a second merchant and capable of creating one or more of the second virtual currency units. The system may also receive, at the first merchant node, a second transaction request for a second transaction transferring one or more of first virtual currency units from the second customer account to a third customer account associated with a third customer computing device of the plurality of customer computing devices within the system. In response, the system may validate, at the first merchant node, the second transaction request and generate, at the first merchant node, a second transaction receipt after the second transaction request has been validated. The system may transmit the second transaction receipt to at least the second merchant node on the system for storage to update the record of first virtual currency transactions within the system. The system may also receive, at a point-of-sale (POS) terminal associated with the first merchant, a first redemption request to redeem one or more of the first virtual currency units from one of the first customer account, the second customer account, or a third customer account associated with a third customer computing device of the plurality of customer computing devices within the system. In response, the system may validate, at the first merchant node, the first redemption request and generate, at the first merchant node, a first redemption receipt after the first redemption request has been validated. The system may transmit the first redemption receipt to at least the second merchant node on the system for storage to update the record of first virtual currency transactions within the system.

In some embodiments, the first merchant node may include one or more first merchant nodes associated with the first merchant. The one or more first merchant nodes may be exclusively capable of creating the first virtual currency units within the system. Similarly, the second merchant may be unaffiliated with the first merchant and include one or more second merchant nodes associated with the second merchant. The one or more second merchant nodes may be exclusively capable of creating the second virtual currency units within the system.

In further embodiments, issuing one or more of the first virtual currency units to the first customer account may include additional steps. For example, it may include validating, at the first merchant node, the issuance request and generating, at the first merchant node, an issuance receipt after the issuance request has been validated. It may also include sending the issuance receipt to at least the second merchant node on the system for storage to update the record of first virtual currency transactions within the system.

In some embodiments, validating the first transaction may include additional steps. For example, it may include receiving, by the first merchant node, a notification of successful verification by the first customer computing device based on a first customer public key associated with the first customer computing device and a first customer private key known only to the first customer computing device. It may also include comparing, by the first merchant node, a purported first merchant private key known only to the first merchant node and associated with a first merchant public key to a stored first merchant private key. Further, it may include validating the first transaction based on the received notification and the comparison.

The system may be further configured to receive, at the first merchant node, a third transaction receipt from the second merchant node for storage to update a record of second virtual currency transactions within the system.

In yet another aspect of the disclosed technology, a first merchant node of a plurality of merchant nodes on a semi-private blockchain virtual currency exchange system is disclosed. The plurality of merchant nodes may include the first merchant node associated with a first merchant and a plurality of unaffiliated merchant nodes each associated with an unaffiliated merchant. The first merchant node may be exclusively capable of creating and redeeming first virtual currency units within the system. Each of the plurality of unaffiliated merchant nodes may be exclusively capable of creating and redeeming another type of merchant-specific virtual currency units within the system. The first merchant node may include one or more processors and a memory in communication with the one or more processors and storing instructions that, when executed by the one or more processors, are configured to cause the first merchant node to perform steps of a method. Specifically, the first merchant node may create a plurality of first virtual currency units and issue one or more of the first virtual currency units to one or more of a plurality of customer accounts each associated with one of a plurality of customer computing devices within the system. The first merchant node may create an issuance receipt after the one or more first virtual currency units have been issued and send the issuance receipt to a randomly-identified subset of the plurality of unaffiliated merchant nodes for storage to record the issuance receipt within the system. Further, the first merchant node may receive one or more transaction requests for transferring one or more of the first virtual currency units between two or more of the customer accounts. In response, the first merchant node may validate each of the transaction requests, create a transaction receipt after each of the transaction requests has been validated, and send each of the transaction receipts to a first randomly-identified subset of the plurality of unaffiliated merchant nodes for storage to record the issuance receipt within the system. The first merchant node may also receive one or more redemption requests to redeem one or more of the first virtual currency units from one of the customer accounts. In response, the first merchant node may validate the redemption request, create a redemption receipt after the redemption request has been validated, and send the redemption receipt to a second randomly-identified subset of the plurality of unaffiliated merchant nodes for storage to record the issuance receipt within the system.

In some embodiments, the first virtual currency may include rewards credits that are exclusively redeemable from the first merchant via the first merchant node. In some embodiments, the plurality of unaffiliated merchant nodes may include at least a second merchant node and a third merchant node, the second merchant node being exclusively capable of creating and redeeming second virtual currency units within the system and the third merchant node being exclusively capable of creating and redeeming third virtual currency units within the system.

In further embodiments, the first merchant node is further configured to randomly determine the first randomly-identified subset of the plurality of unaffiliated merchant nodes and randomly determine the second randomly-identified subset of the plurality of unaffiliated merchant nodes, the first randomly-identified subset differing from the second randomly-identified subset.

In some embodiments, the first merchant node may also include a POS terminal associated with the first merchant. The POS terminal may provide an interface for issuing and redeeming one or more of the first virtual currency units. In some embodiments, the POS terminal may be a physical POS terminal located at a merchant storefront, and in other embodiments, the POS terminal may be entirely virtual (e.g., in the case of an online merchant).

Although some of the above embodiments are described with respect to systems, it is contemplated that embodiments with identical or substantially similar features may alternatively be implemented as methods and/or non-transitory computer-readable media, and vice versa.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 depicts an example semi-private blockchain virtual currency exchange system according to an example implementation of the disclosed technology. The example system 100 may include a plurality of devices connected by a network 140. The system 100 may include a plurality of unaffiliated merchant nodes 120 (individually 120A, 120B, etc.). Each merchant node may be associated with a merchant and exclusively capable of creating and issuing virtual currency units within the system 100. It is to be understood that any merchant node (e.g., merchant node 120A) may consist of a single node or multiple nodes all affiliated with a single merchant. One or more unaffiliated merchant nodes may be associated with an unaffiliated merchant and exclusively capable of creating another type of merchant-specific virtual currency units within the system (e.g., merchant node 120B is an unaffiliated merchant node with respect to merchant node 120A). Each merchant node 120 may include one or more of a plurality of merchant POS terminals 130 (individually 130A, 130B, etc.), which may provide an interface for issuing and redeeming one or more of the respective virtual currency units which the merchant node 120 may create. It is to be understood that the merchant POS terminal 130 associated with each merchant node 120 may be a single terminal or multiple terminals (or other types of computing devices) associated with the corresponding merchant node 120 (e.g., the merchant node 120A may be matched with merchant POS terminal 130A).

Further, the system 100 may be in communication (e.g., via the network 140) with a plurality of customer devices 110 (individually 110A, 110B, etc.). The plurality of customer device 110 may not create any type of virtual currency within the system 100, but the system 100 may enable the plurality of merchant nodes 120 to transfer existing virtual currency units to one or more of the customer devices 110. Each customer device 110 may also transfer virtual currency to any other customer device 110 (e.g., a transfer of currency from the customer device 110A to the customer device 110B). Whenever a transaction or redemption of any virtual currency occurs within the system 100, the merchant node 120 responsible for the transaction or redemption of currency may send a transaction or redemption receipt to one or more of the unaffiliated merchant nodes 120 in order to record the transaction, where the respective unaffiliated merchant node 120 may store the transaction or redemption on a merchant database 122 (e.g., each merchant node 120A corresponds to a respective merchant database 122A). It is to be understood that the merchant database 122 may be a single database or multiple databases associated with the corresponding merchant node 120.

The system 100 may include an authorization node 150 which may, via the network 140, authorize the plurality of merchant nodes 120 to create and issue their corresponding virtual currencies. The authorization node 150 may be in communication with an authorization database 152 on which the authorization node may store the identity of each merchant node 120 in the system 100, and which respective virtual currencies each merchant node 120 may create and/or issue. Like the merchant node 120, it is understood that the authorization node 150 may include one or more authorization nodes capable of authorizing the plurality of merchant nodes 120 to create and issue virtual currency. In some embodiments, the authorization node 150 and/or its designated nodes may be exclusively capable of creating and issuing generic virtual currency units within the system 100.

Figure 2:
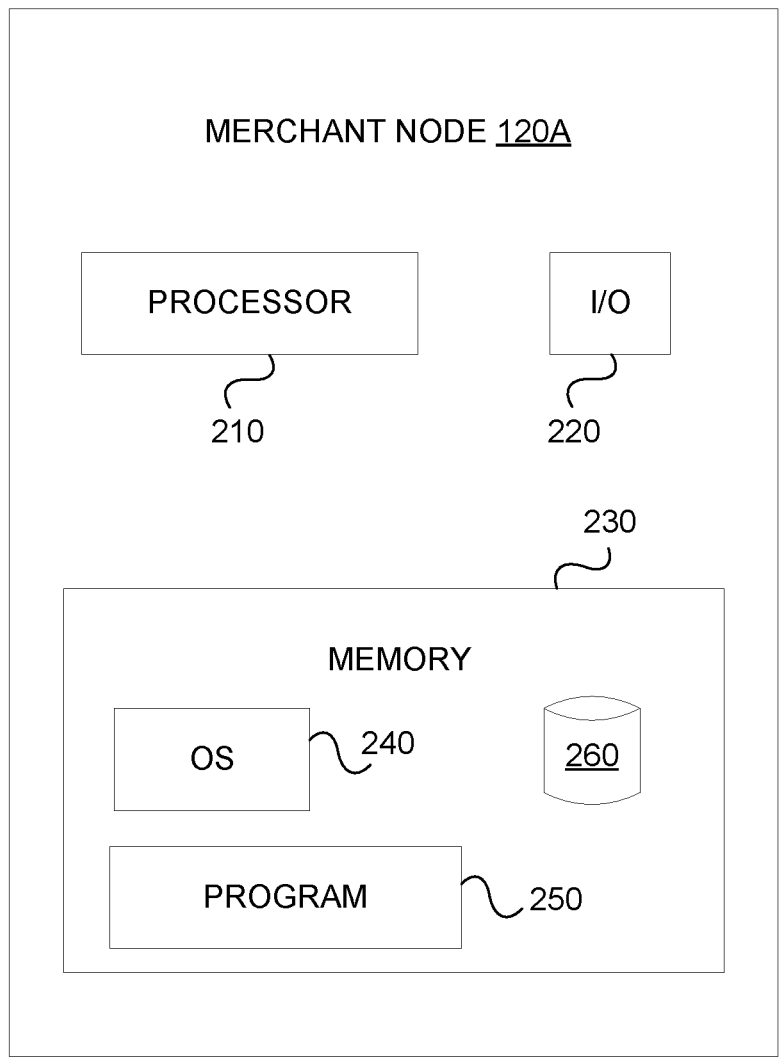
FIG. 2 is a component diagram of a merchant node in accordance with some exemplary embodiments.

As shown in more detail in FIG. 2, the merchant node 120 may include a processor 210, an input/output ("I/O") device 220, a memory 230 containing an operating system ("OS") 240, a program 250, and a database 260. For example, the merchant node 120 may be a single device or server or may be configured as a distributed computer system including multiple servers, devices, or computers that interoperate to perform one or more of the processes and functionalities associated with the disclosed embodiments. In some embodiments, the merchant node 120 may further include a peripheral interface, a transceiver, a mobile network interface in communication with the processor 210, a bus configured to facilitate communication between the various components of the merchant node 120, and a power source configured to power one or more components of the merchant node 120. Servers, databases, and other computing devices (e.g., the authorization node 150, the merchant POS terminal 130, and the customer device 110) included in the system 100 may include many components that are similar to or even have the same capabilities as those described with respect to the merchant node 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g., such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

The processor 210 may be one or more known processing devices, such as a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

The merchant node 120 may include one or more storage devices configured to store information used by the processor 210 (or other components) to perform certain functions related to the disclosed embodiments. In some embodiments, the merchant node 120 may include a memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the merchant node 120 may include the memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the merchant node 120 may include the memory 230 that may include one or more programs 250 to perform one or more functions of the disclosed embodiments. Moreover, the processor 210 may execute one or more programs 250 located remotely from the system 100. For example, the system 100 may access one or more remote programs 250, that, when executed, perform functions related to disclosed embodiments.

The memory 230 may include one or more memory devices that store data and instructions used to perform one or more features of the disclosed embodiments. The Memory 230 may also include any combination of one or more databases controlled by memory controller devices (e.g., server(s), etc.) or software, such as document management systems, Microsoft™ SQL databases, Mongo databases, SharePoint™ databases, Oracle™ databases, Sybase™ databases, or other relational or non-relational databases. The memory 230 may also include software, such as Hadoop™, enabling the system to store and process large volumes of data distributed across a cluster of commodity servers and commodity storage connected via the network 140. The memory 230 databases may consist of files on the system 100 that are simply read into the memory, and the disclosed embodiments are not limited to separate databases or even to the use of a database. The memory 230 may include software components that, when executed by the processor 210, perform one or more processes consistent with the disclosed embodiments. In some embodiments, the memory 230 may include a database 260 for storing related data to enable the merchant node 120 to perform one or more of the processes and functionalities associated with the disclosed embodiments.

The merchant node 120 may also be communicatively connected to one or more memory devices (e.g., databases) locally or through the network 140. The remote memory devices may be configured to store information and may be accessed and/or managed by the merchant node 120. By way of example, the remote memory devices may be document management systems, Microsoft™ SQL database, Mongo databases, SharePoint™ databases, Oracle™ databases, Sybase™ databases, or other relational or non-relational databases. The remote memory devices may also include software, such as Hadoop™, enabling them to store and process large volumes of data distributed across a cluster of commodity servers and commodity storage connected via the network 140. These memory devices may consist of files on the system 100 that are simply read into the memory, and the disclosed embodiments are not limited to separate databases or even to the use of a database. Systems and methods consistent with disclosed embodiments, however, are not limited to separate databases or even to the use of a database.

The merchant node 120 may also include one or more I/O devices 220 that may comprise one or more interfaces for receiving signals or input from devices and providing signals or output to one or more devices that allow data to be received and/or transmitted by the merchant node 120. For example, the merchant node 120 may include interface components, which may provide interfaces to one or more input devices, such as one or more keyboards, mouse devices, touch screens, track pads, trackballs, scroll wheels, digital cameras, microphones, sensors, scanners, and the like, that enable the merchant node 120 to receive data from one or more users.

In exemplary embodiments of the disclosed technology, the merchant node 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the merchant node 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the merchant node 120 may include a greater or lesser number of components than those illustrated.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high-level and/or low-level software instructions, such as machine code (e.g., such as that produced by a compiler) and/or high-level code that can be executed by a processor using an interpreter.

Returning to FIG. 1, the customer device 110 may have some or all of the components of the merchant node 120. The customer device 110 may be a mobile computing device carried by a user of the system. The customer device 110 may be associated with a respective customer account capable of receiving virtual currency that may be issued by the merchant node 120. The customer device 110 may further be configured so that virtual currency may be transferred from one customer device 110 to another (e.g., from the customer device 110A to the customer device 110B) by sending the associated merchant node 120 (e.g., the merchant node 120A may be associated with the customer device 110A) a transaction request to be validated. Upon validation, the merchant node 120 may validate the transaction request and create a transaction receipt which may be broadcast to other nodes on the system 100 in order to record the transaction on the blockchain. In some embodiments, the customer device 110 may redeem virtual currency in its associated customer account by sending the POS terminal 130 a redemption request when the customer device 110 is within a predetermined range of the respective merchant POS terminal 130 corresponding to the merchant node 120 that created the virtual currency.

The merchant node 120 may perform a variety of functions on the blockchain, including creating and issuing virtual currency units. Further, the merchant node 120 may be configured to receive transaction requests for exchanging one or more units of virtual currency for a second currency type of virtual currency between a customer account associated with a first customer device 110A and a second customer device 110B, while neither of the customer devices 110 may be authorized or capable of issuing or creating their own virtual currency units. The merchant node 120 may validate the transaction requests and in turn create a transaction receipt after validation. Following validation, the merchant node 120 (e.g., merchant node 120A), may send to an unaffiliated merchant node 120 (e.g., merchant node 120B) the transaction receipt for storage in order to record the transaction receipt on the system. Further, the merchant node 120 may receive redemption requests from the associated merchant POS terminal 130 to redeem virtual currency from one of the plurality of user customer accounts associated with the plurality of customer devices 110. The merchant node 120 (e.g., merchant node 120A) may validate the redemption requests and create a redemption receipt after validation and may send the generated redemption receipt to an unaffiliated merchant node 120 (e.g., merchant node 120B) to record the redemption receipt on the blockchain.

Each of the plurality of merchant databases 122 (e.g., merchant databases 122A and 122B) are associated with the corresponding merchant node 120 (e.g., merchant node 120A and 120B, respectively). Responsive to the corresponding merchant node 120 receiving either a transaction receipt or a redemption receipt from the unaffiliated merchant node 120, the system 100 may save the contents of either the transaction receipt or redemption receipt to the corresponding merchant database 122 in order to record the transactions and redemptions to the blockchain.

The system 100 may initiate a redemption request in response to an indication that the user device 110 would like to redeem virtual currency associated with the merchant node 120. The merchant POS terminal 130, in response to an indication that the user device 110 is within a predetermined range and wishes to redeem virtual currency, may send the redemption requests to the associated merchant node 120. Accordingly, the merchant POS terminal 130 provides an interface for issuing and redeeming virtual currency units. Further, in some embodiments the POS terminal may be a physical POS terminal located at a merchant storefront, and in other embodiments, the POS terminal may be entirely virtual (e.g., in the case of an online merchant).

Facilitating communication between components of the system 100, the network 140 may be of any suitable type, including individual connections via the Internet such as cellular or WiFi networks. In some embodiments, the network 140 may connect terminals, services, and mobile devices using direct connections such as radio-frequency identification (RFID), near-field communication (NFC), Bluetooth™, low-energy Bluetooth™ (BLE), WiFi™, Ethernet, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The authorization node 150 of the system 100 may authorize certain nodes to become one of the plurality of the merchant node 120, giving the merchant nodes 120 the sole authority to issue its corresponding virtual currency. In some embodiments, the respective merchant node 120 may also have sole authority to redeem its virtual currency, though an unaffiliated merchant node 120B may be capable of redeeming another merchant's virtual currency (e.g., issued by merchant node 120A) in other embodiments (e.g., when Bob's Burgers and Sally's Salad shop agree to let customers redeem either merchant's rewards points at both merchant locations). The authorization node 150 may be in communication with the authorization database 152 on which the authorization node may store the identity of each merchant node 120 in the system 100, and which respective virtual currencies each of the merchant nodes 120 may create and/or issue. Further, the authorization node 150 may create a generic virtual currency and set an exchange value between each merchant-issued virtual currency and the generic virtual currency. In some embodiments, the authorization node 150 may authorize an unaffiliated merchant node 120 to create and issue the generic virtual currency.

Figure 3:
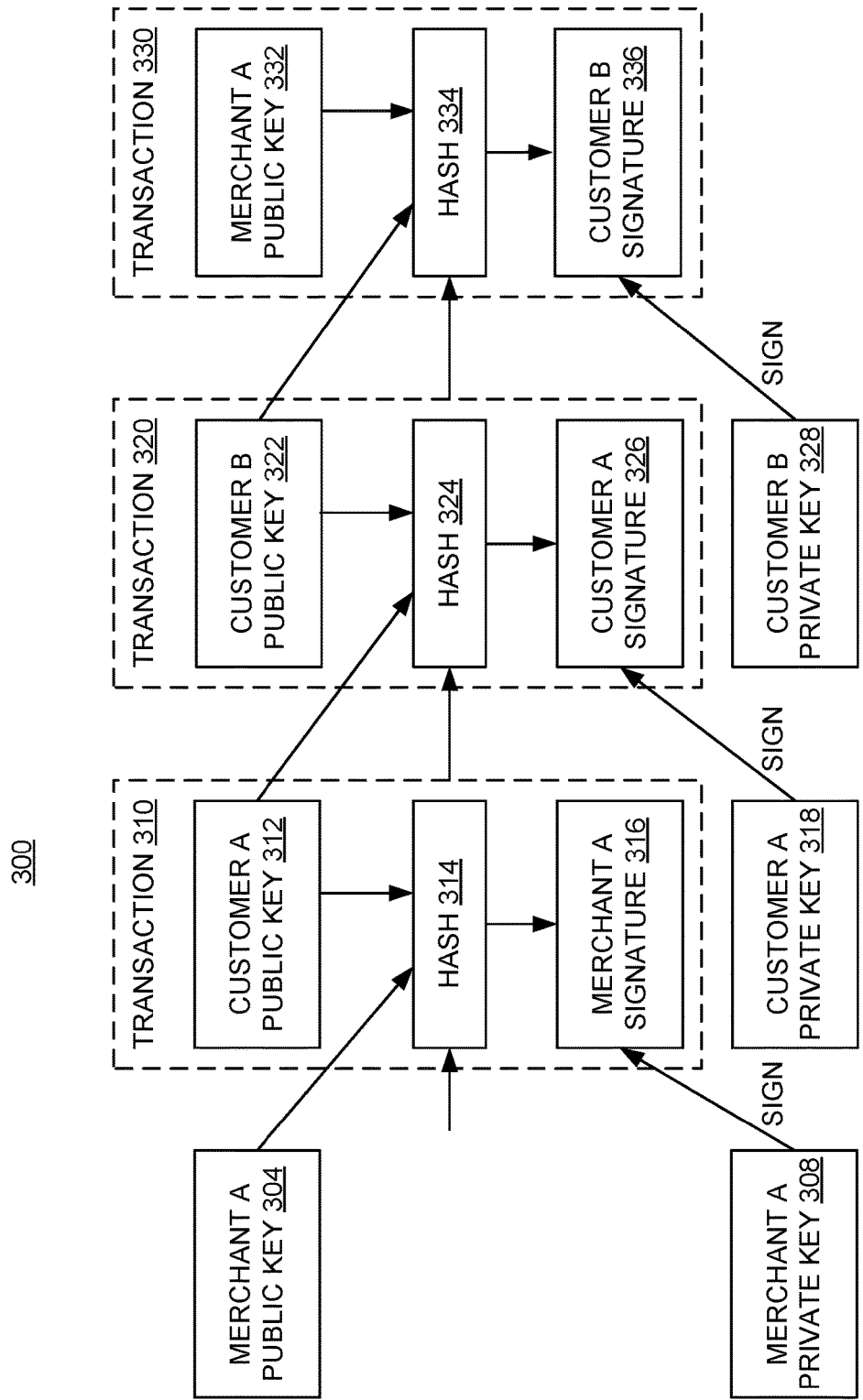
FIG. 3 is a flow diagram for a transaction history in which merchant A issues virtual currency units to customer A, who transfers the virtual currency units to customer B, who eventually redeems them from merchant A, in accordance with some exemplary embodiments.

FIG. 3 is a flow diagram for a chain of ownership in which each payor transfers a virtual digital currency to each successive recipient, in turn, by digitally ratifying a record including a hash of the previous transaction. It is to be understood that a transaction (e.g., transaction 310) may include a customer to customer virtual currency transfer, a merchant to customer virtual currency issuance, a customer to merchant virtual currency redemption, or even a merchant to merchant virtual currency exchange, where two unaffiliated merchants (e.g., via the merchant node 120A and unaffiliated merchant node 120B) may exchange a first virtual currency for a second virtual currency, the first virtual currency issued exclusively by the first merchant node 120A and the second virtual currency issued exclusively by the second merchant node 120B. In a first transaction 310, Merchant A (e.g., Al's Ice Cream Hut acting via the merchant node 120A) issues virtual currency (e.g., Al-points) to Customer A by applying Merchant A's digital signature 316, based on Merchant A's private key 308, to a cryptographic hash 314 of the combination of the previous transaction's output combined with the public key 312 of the next owner, Customer A. A second transaction 320 indicates the transfer from Customer A to Customer B of the same virtual currency (e.g., Al-points), characterized by the application of Customer A's digital signature 326, based on Customer A's private key 318, to a cryptographic hash 324 of the combination of the previous transaction 310's output combined with Customer B's public key 322. In a third transaction 330, Customer B redeems the same virtual currency (e.g., Al-points) from Merchant A (e.g., with Al's Ice Cream Hut receiving the virtual currency and providing a corresponding discount, product or service to Customer B) by applying Customer B's digital signature 336, based on the Customer B's private key 328, to a cryptographic hash 334 of the combination of previous transaction 320's output combined with Merchant A's public key 332.

It shall be understood that transaction validation by way of a private key and signature is a non-limiting exemplary embodiment for ease of description, wherein this private form may be used for indicating that a corresponding entity (e.g., Customer A) has ownership over the virtual currency which may be exercised by signing the corresponding private key to the hash.

Figure 4:
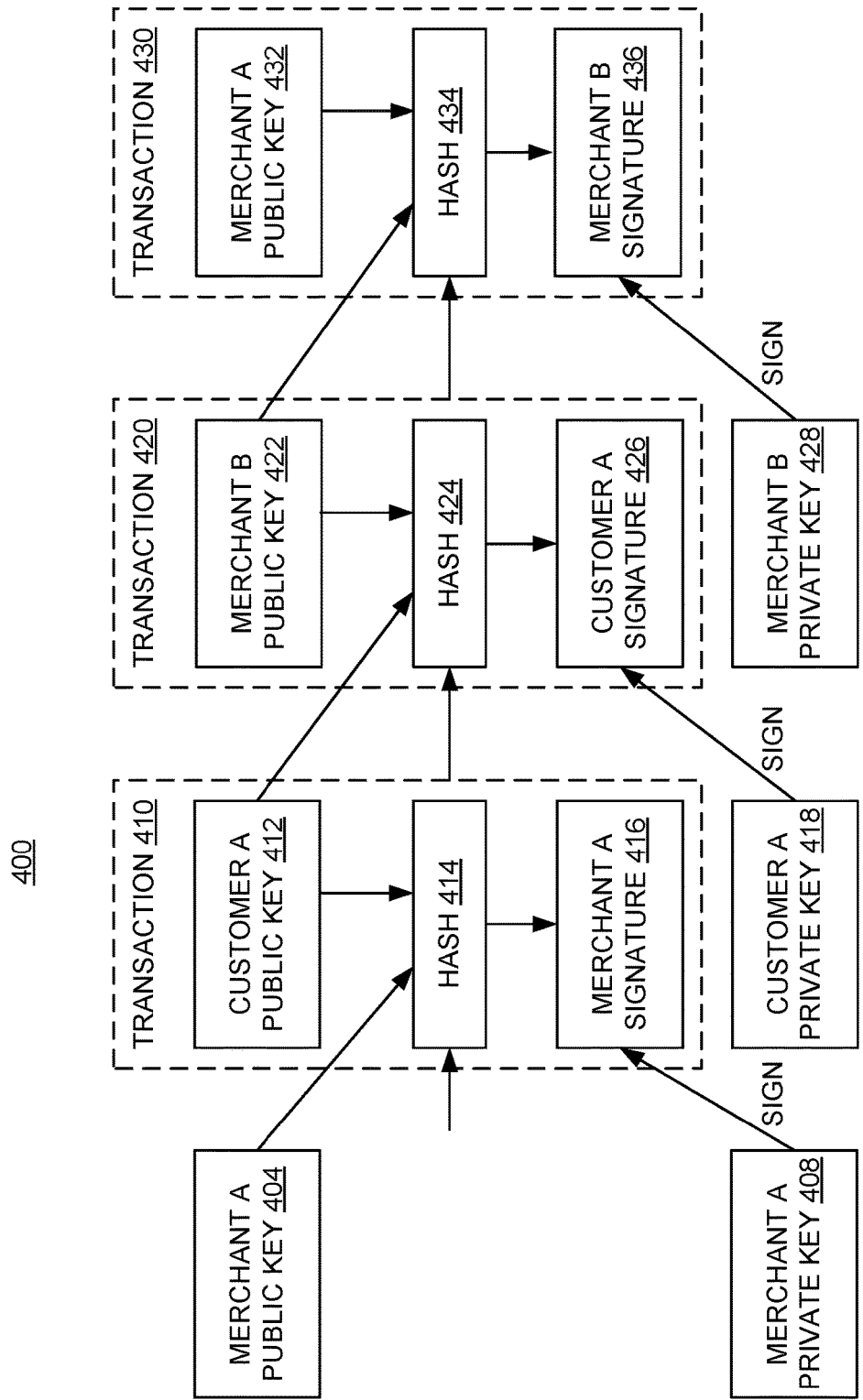
FIG. 4 is a flow diagram for a chain of ownership in which a customer transfers a virtual digital currency associated with merchant A to merchant B in exchange for virtual digital currency associated with merchant B.

Similarly, FIG. 4 is a flow diagram for a chain of ownership in which a customer transfers a virtual digital currency issued from Merchant A to Merchant B. In this scenario, Merchant A and Merchant B may have a mutual agreement to allow customers to exchange virtual currency associated with Merchant A with Merchant B and vice versa, for a predetermined exchange rate. For example, Al's Ice Cream Hut and Bill's Burgers Joint may agree to exchange Al-points and Bill-points between one another and allow customers to redeem Al-points and/or Bill-points from either merchant. Once a customer redeems a first virtual currency (e.g., Al-points) from an unaffiliated merchant (e.g., Bill's Burgers), the two unaffiliated merchants (e.g., via the merchant node 120A on behalf of Al's Ice Cream Hut and the merchant node 120B on behalf of Bill's Burger joint) may exchange the first virtual currency (e.g., the previously mentioned Al-points) for a second virtual currency (e.g., Bill-points). Each merchant can then proceed to reissue its respective points to future customer(s), as each is exclusively capable of issuing its merchant-specific virtual currency to customers (e.g., via merchant node 120A or B). As shown in FIG. 4, Customer A in transaction 420 transfers virtual currency associated with Merchant A to Merchant B in lieu of virtual currency associated with Merchant B. Merchant B may then transfer the virtual currency associated with Merchant A to Merchant A in transaction 430 in exchange for a predetermined amount of virtual currency associated with Merchant B per the mutual agreement between the participating merchants. In an alternative embodiment, such a transfer of virtual currency to merchants may be facilitated by a predetermined exchange rate utilizing the generic virtual currency issued by the authorization node 150 as an intermediary currency for the exchange. In this manner, and in some embodiments, merchant-specific virtual currency may be redeemed at unaffiliated merchants working in cooperation with the issuing merchant, which may entice certain customers to make subsequent purchases (e.g., ice cream or movie tickets following dinner) utilizing obtained virtual currency without having to wait until they visit the same merchant again.

A hash (e.g., hash 314) is a uniquely identifying cryptographic 'fingerprint' of an arbitrarily large amount of data. The same hash will always result from the same data, but even the most minute change to the data will significantly change the value of the hash. The cryptographic hash of a combination of the transaction's output and the public key of the next owner is appended to the end of the chain of ownership. A recipient may verify the hashes and corresponding digital signatures based on the private keys in order to verify the chain of ownership.

Figure 5:
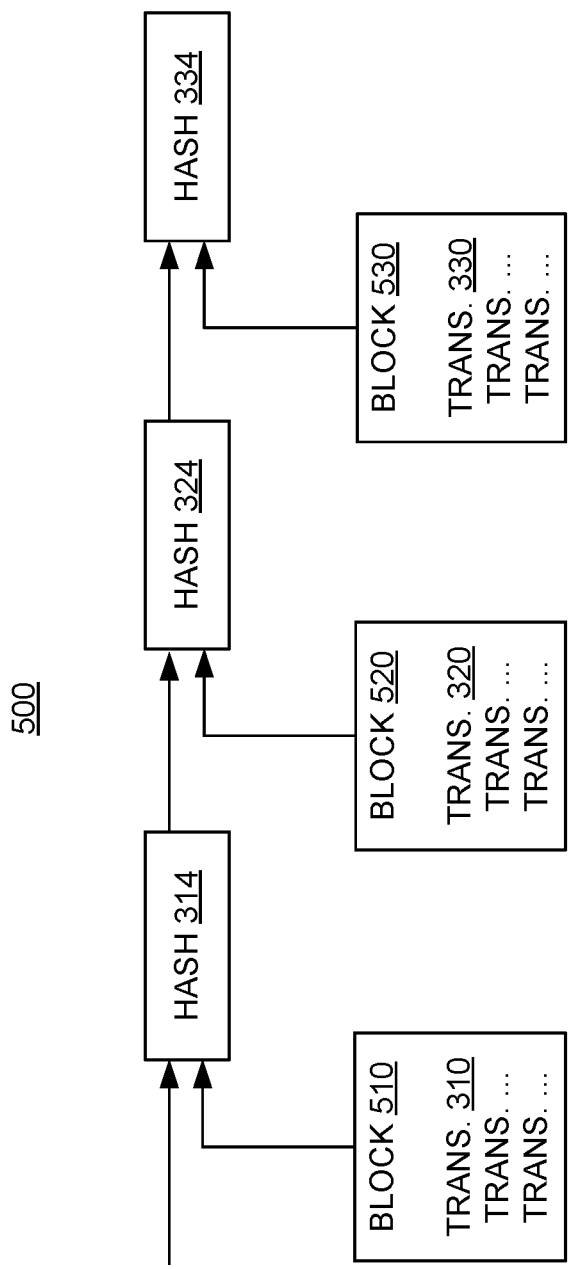
FIG. 5 is a block diagram of a chain made up of groups of transaction blocks to be timestamped and widely published, according to some exemplary embodiments.

In order to verify the chain of ownership without a trusted intermediary, transactions may be publicly broadcast and a system of verification is employed for participants to agree on a single history of the distributed ledger, as shown in more detail in FIG. 5. The recipient of the virtual currency requires proof that, at the time of the transaction, all nodes having received the corresponding transaction receipt have verified the chain of ownership information contained within the cryptographic hash.

An exemplary solution for providing the requisite level of proof to ensure the proper chain of ownership is to utilize a timestamp system implemented by each merchant node 120 capable of sending a transaction receipt for verification. The merchant nodes 120 may implement a process 500 that takes the cryptographic hash 314 of the combination of a previous hash combined with a block 510 including one or more transactions, here including transaction 310 that is the transaction 310 of FIG. 3, to be time stamped and widely publishes the cryptographic hash 314 by sending it a plurality of unaffiliated merchant nodes for recording to the system 100. The timestamp shows that the data within the block 510, including the recordation of the transaction item 310 existed at the time the block 510 was formed in order to be incorporated into cryptographic hash 314. Once Customer A authorizes the transaction 320 of FIG. 3, this transaction item 320 may be included in a subsequent block 520, which is cryptographically hashed in combination with the output of the previous hash 314. Similarly, once Customer B authorizes the transaction 330 of FIG. 3, this transaction 330 may be included in a subsequent block 530, which is cryptographically hashed in combination with the output of the previous hash 324. Accordingly, each timestamp includes the previous timestamp in its hash to form a blockchain, each timestamp acting to reinforce the timestamp preceding it. It is to be understood that each block appended to the hash may contain additional transaction information beyond the type and amount of virtual currency transferred by the merchant node 120, such as, for example, the value of the transferred merchant virtual currency in a generic virtual currency units as defined by the authorization node 150.

The system may be configured to timestamp either the blocks alone or in conjunction with transaction timestamping. Alternatively, the system may timestamp transactions in lieu of block timestamping. When timestamping transactions alone or in conjunction with timestamping blocks, the ordering of transactions with the block may be in chronological order.

In exemplary embodiments of the present disclosure, such a blockchain is maintained by the system of communicating nodes connected by the network 140. Transactions (e.g., Customer X transferring Virtual Currency A to Customer Y) may be validated by merchant node 120A, added to that node's copy of the ledger, and then broadcast to one or more unaffiliated merchant nodes 120B, 120C, etc. The receiving merchant nodes 120 may then store a copy of the blockchain. Each new block incorporates a group of verified transactions, and is added to the blockchain, which is published to a plurality of nodes. This allows a distributed blockchain system to determine when particular virtual currency units have been transferred or used. Determining when a particular virtual currency unit has been used is necessary to prevent double spending in a system without a central trusted authority.

In exemplary embodiments of the present disclosure, the system 100 helps provide merchants and their customers with certain benefits in the virtual currency marketplace. Particularly, the system 100 helps prevent fraudulent transactions, avoid counterparty risk, verify rights and funds, and allows account oversight without requiring transferring title to such assets to the system. This is achieved by a process for onboarding carefully selected merchant nodes 120 by the authorization node 150. A trusted network of merchants, each solely responsible for the creation and issuance of its own virtual currency is established. Merchant nodes 120 will be the custodians of the conventional rights to the virtual currency funds, and the customers associated with the plurality of customer devices 110 will control their own virtual currency assets.

Figure 6:
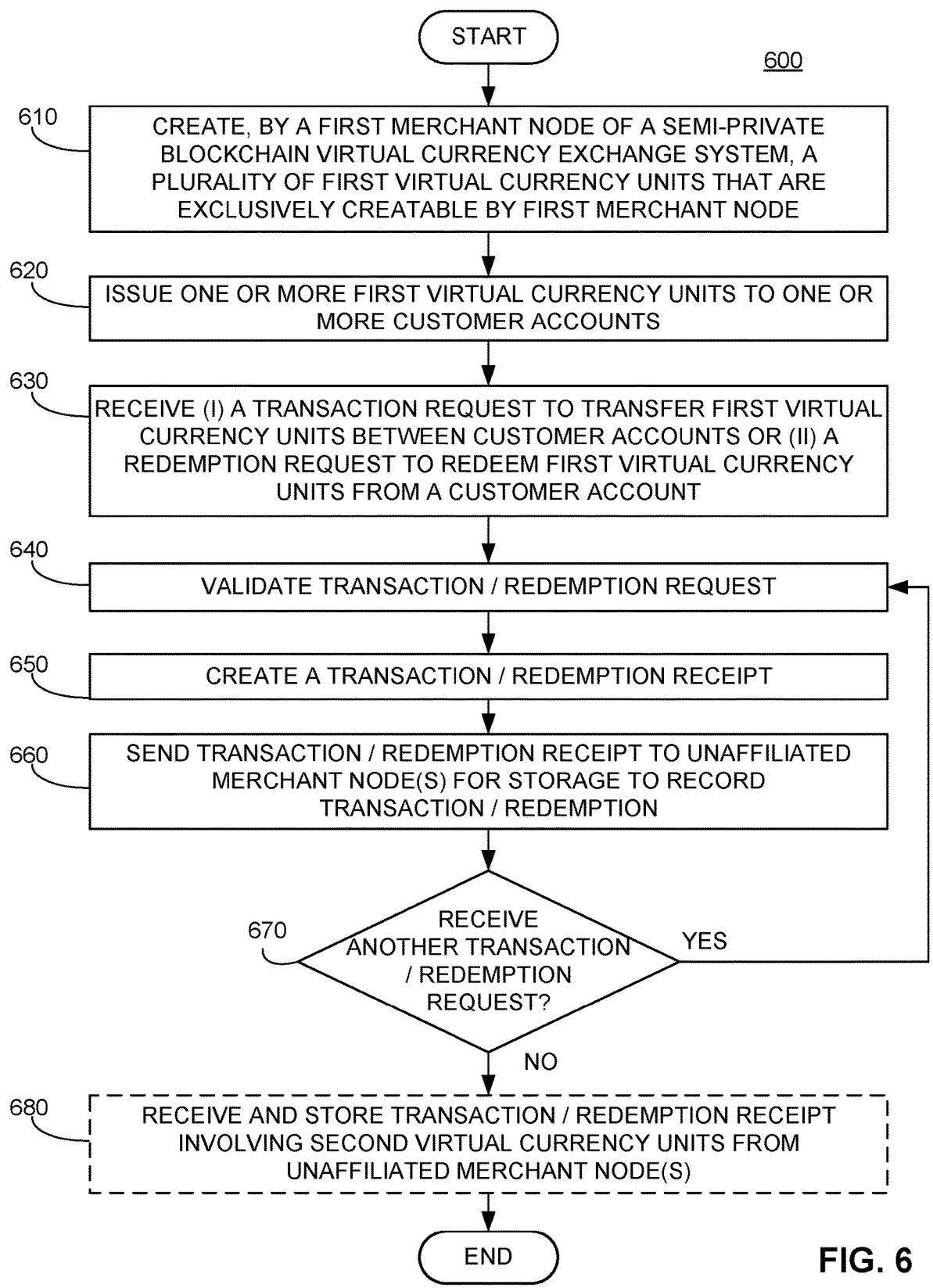
FIG. 6 is a flow diagram of a method for providing units of a first virtual currency for exchange within the system of FIG. 1 in accordance with some exemplary embodiments.

FIG. 6 is a flow diagram of a method for providing units of a first virtual currency for exchange within the system of FIG. 1 in accordance with some exemplary embodiments. In block 610, the semi-private blockchain virtual currency exchange system (e.g., via a first merchant node 120A) may create a plurality of virtual currency units that are exclusively creatable by the first merchant node. In other embodiments, the merchant node 120A may create one or more types of virtual currency units, so long as merchant node 120A (which represents all nodes associated with Merchant A) is exclusively capable of creating those type(s) of merchant-specific virtual currency units on the system 100. The virtual currency units may be associated with any type of rewards points, loyalty points, discounts, or other customer incentives to make a particular purchase (e.g., for a good or service sold by Merchant A) or reward customer behavior.

In block 620, the first merchant node (e.g., the merchant node 120A) may issue one or more of the first virtual currency units to one or more customer accounts, with each customer account being associated with its corresponding customer device (e.g., Customer Account A associated with customer device 110A). This issuing of first virtual currency units may happen at a point-of-sale (POS) location (e.g., immediately upon a first customer making a purchase at Merchant A) and may be performed in conjunction with merchant POS terminal 130A. That is, the merchant node 120A may issue one or more of the first virtual currency units to a first customer account associated with the customer device 110A directly (e.g., via the network 140) or indirectly through the merchant POS terminal 130A (e.g., via the network 140 or another direct communication means at the POS location).

Figure 7:
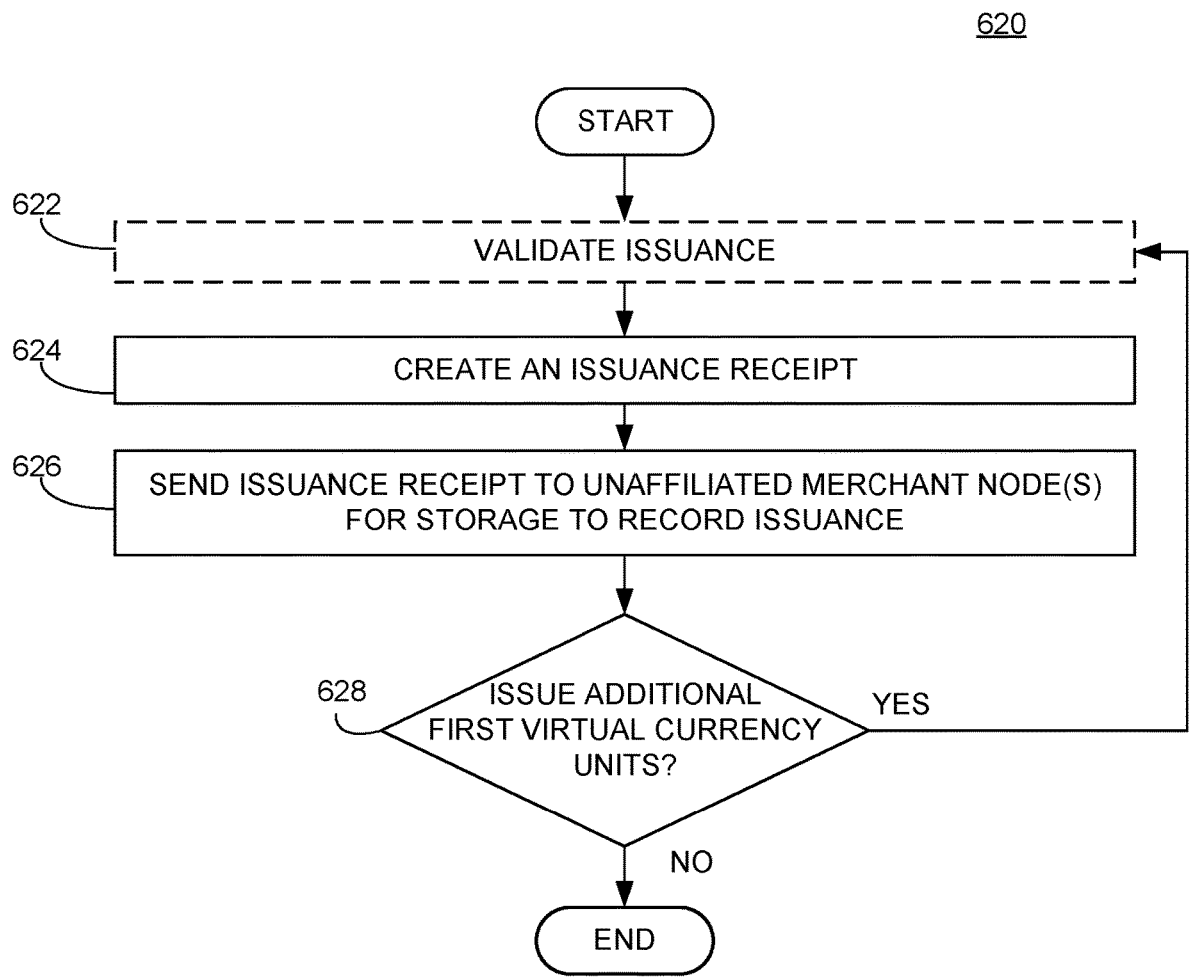
FIG. 7 is a flow diagram of a method for issuing virtual currency units to customers at a point-of-sale location, according to some exemplary embodiments.

In some embodiments in which virtual currency units are issued at the POS location, the issuance step shown in block 620 may include additional steps shown in blocks 622-628 as shown in FIG. 7. Optionally, in block 622, the merchant node 120 (e.g., the merchant node 120A) may validate an issuance if the issuance is properly verified with the appropriate signature based on the merchant private key (e.g., merchant A private key 308 may be the appropriate private key for an issuance by the merchant node 120A). In response to a properly validated issuance in block 622, the merchant node 120A may create an issuance receipt in block 624 and send the issuance receipt to unaffiliated merchant nodes (e.g., merchant nodes 120B, 120C, etc. unaffiliated to merchant node 120A) in block 626 in order to store and record the issuance to the blockchain. After generating the transaction or redemption receipt, the merchant node 120A may send the transaction or redemption receipt to one or more unaffiliated merchant nodes (e.g., merchant nodes 120B, 120C, etc.) for storage to record the transaction or redemption to the blockchain, as shown in block 660. In some embodiments, the merchant node 120A may send the receipt to all unaffiliated merchant nodes (e.g., merchant nodes 120B-Z out of merchant nodes 120A-Z) on the system 100. In other embodiments, the merchant node 120A may randomly identify a subgroup of unaffiliated merchant nodes (e.g., merchant nodes 120B, 120E, and 120Z out of merchant nodes 120B-Z) each time it generates a receipt and only send the receipt to the identified subgroup. In other embodiments, the merchant node 120A may identify a subgroup of unaffiliated merchant nodes that are regionally nearest to the merchant node 120A and only send the receipt to the identified subgroup. Sending the receipt to the subgroup of merchant nodes regionally nearest to the merchant node 120 may decrease transaction latency. The merchant node 120A may vary the number of unaffiliated merchant nodes in the subgroup in some embodiments or keep that number constant for sending receipts in other embodiments. Further, in some embodiments, the number of unaffiliated merchant nodes in the subgroup may stay above a predetermined minimum such that a "critical mass" of merchant nodes on the system 100 can cross-reference and verify transactions without requiring that all merchant nodes expend resources to do so. After sending the receipt to other nodes, the merchant node 120A may determine whether to issue additional currency units as shown in block 628 and, if appropriate, repeat steps from blocks 622-626.

At any point in time (e.g., immediately upon acquiring first virtual currency units or after determining a subsequent purchase that any type of virtual currency units supported by the system 100 could be used for), the customer may decide to either exchange or redeem one or more of the first virtual currency units using the customer device 110A. When that occurs, as shown in block 630, the first merchant node may receive one of (i) a transaction request to transfer the first virtual currency units between a first and a second customer account (e.g., between customer device 110A and customer device 110B) or (ii) a redemption request to redeem the first virtual currency units from a customer account, with each transfer and/or redemption of virtual currency units may follow the flow of ownership established in flow diagrams FIGS. 3 and 4.

Responsive to receiving a transaction request or redemption request in block 630, the merchant node 120A may validate the request in block 640 in accordance with the steps described with respect to FIGS. 3 and/or 4. For example, for a transaction request between customers (e.g., between Customer A and Customer B as shown in the transaction 320 of FIG. 3), Merchant A (e.g., via the merchant node 120A) may validate one or more of the transaction history associated with the virtual currency units (e.g., hash 314 and/or Merchant A's signature 316 from transaction 310 in FIG. 3) and Customer A's signature 326 based on Customer A's private key 318. In some embodiments a transaction may include a two-sided currency transfer (e.g., a virtual currency transfer going from Customer A to Customer B and vice versa), and in other embodiments a transaction may include only one virtual currency transfer (e.g., a virtual currency transfer going from Customer A to Customer B, with Customer B paying Customer A in cash). Customer to customer transactions may be accomplished by either a single transaction swapping two types of currencies, or may be accomplished with sequential transactions added to the blockchain at virtually the same time.

Similarly, for a redemption request from a customer (e.g., between Customer B and Merchant A in transaction 330 in FIG. 3), Merchant A (e.g., via the merchant node 120A) may validate one or more of the transaction history associated with the virtual currency units (e.g., hash 324, which includes hash 314 and Merchant A's signature 316 from transaction 310, and/or Customer A's signature 326 based on Customer A's private key 318 from transaction 320 in FIG. 3) and Customer A's signature 326 based on Customer A's private key 318. In some embodiments, it may be advantageous for the merchant node 120 to confirm that the customer a sufficient amount of virtual currency for the transaction or redemption. This may be accomplished by validating the transaction history associated with the virtual currency units (e.g., hash 314 and/or Merchant A's signature 316 from transaction 310 in FIG. 3) when the transaction history is configured to include a running total of each customer's virtual currencies.

As shown in block 650, the merchant node 120A may create a corresponding transaction or redemption receipt according to the validated request for either a transaction or redemption. In some embodiments, the transaction or redemption receipt will identify the transaction number, the type and amount of virtual currency units to be exchanged in the transaction or redemption, the date, the involved parties (e.g., sender and recipient(s)), and the type and amount of virtual currency units each participant holds in their respective customer account. After generating the transaction or redemption receipt, the merchant node 120A may send the transaction or redemption receipt to one or more unaffiliated merchant nodes (e.g., merchant nodes 120B, 120C, etc.) for storage to record the transaction or redemption to the blockchain, as shown in block 660. In some embodiments, the merchant node 120A may send the receipt to all unaffiliated merchant nodes (e.g., merchant nodes 120B-Z out of merchant nodes 120A-Z) on the system 100. In other embodiments, the merchant node 120A may randomly identify a subgroup of unaffiliated merchant nodes (e.g., merchant nodes 120B, 120E, and 120Z out of merchant nodes 120B-Z) each time it generates a receipt and only send the receipt to the identified subgroup. In other embodiments, the merchant node 120A may identify a subgroup of unaffiliated merchant nodes that are regionally nearest to the merchant node 120A and only send the receipt to the identified subgroup. Sending the receipt to the subgroup of merchant nodes regionally nearest to the merchant node 120 may decrease transaction latency. The merchant node 120A may vary the number of unaffiliated merchant nodes in the subgroup in some embodiments or keep that number constant for sending receipts in other embodiments. Further, in some embodiments, the number of unaffiliated merchant nodes in the subgroup may stay above a predetermined minimum such that a "critical mass" of merchant nodes on the system 100 can cross-reference and verify transactions without requiring that all merchant nodes expend resources to do so.

After sending the receipt to other merchant node(s), the merchant node 120A may receive another transaction or redemption request, as shown in block 670, and repeat the steps shown in blocks 640-660. Optionally, the merchant node 120A may receive and store transaction and/or redemption receipts for transactions involving other virtual currency units (e.g., second virtual currency units, third virtual currency units, etc.) from unaffiliated merchant nodes (e.g., merchant nodes 120B, 120C, etc.). In a similar manner that it randomly sends receipts to a subset of the merchant nodes on the system 100 in some embodiments, the merchant node 120A may only receive a subset of receipts from other merchant nodes. That is, each merchant node 120 on the system 100 may be solely responsible for issuing its respective merchant-specific virtual currency units, validating transaction and redemption requests associated with those merchant-specific virtual currency units, and generating and sending receipts of those requests to a subset of other merchant nodes 120 on the system 100.

Exemplary Use Cases

The following exemplary use case describes an example of a typical user flow pattern. They are intended solely for explanatory purposes and not in limitation. Merchants often provide rewards, discounts, promotional offers, and the like to customers in order to incentivize and/or reward customer behavior (e.g., buying five cups of coffee to get a free cup). Such rewards may be very attractive to certain customers who frequent a particular merchant, but less attractive and less impactful to others. All too often, customers obtain rewards from a merchant that they are unlikely to redeem (e.g., because they live in an area that lacks a physical store for that merchant, they prefer another merchant, they do not need a particular volume of a product, etc.) and are yet unable to benefit from the rewards by exchanging them with another customer who wants to redeem them.

Certain example implementations of the disclosed technology provide technological improvements in issuing, recording, and validating transactions involving virtual currency. Certain example implementations of the disclosed technology may enable a customer to trade a virtual currency associated with rewards points for Merchant A directly for another virtual currency associated with rewards or loyalty points for Merchant B, without the need for an intermediary or a trusted central authority to verify the transaction. Each customer may have a customer account associated with a customer device (e.g., customer device 110A, 110B, etc.).

In one exemplary use case according to some embodiments, a first customer (Customer A) who has first virtual currency units (e.g., taco rewards points) associated with a first merchant (Merchant A) is about to enter a coffee shop associated with a second merchant (Merchant B) and wishes to exchange some of her taco rewards points for coffee rewards points that can be used at the coffee shop. Using an application on the customer device 110A, Customer A may manually identify or automatically be presented with (e.g., via the application on the customer device 110A and/or one or more merchant nodes 120) one or more customers who have desired virtual currency units here, coffee rewards points. The application identifies a second customer (Customer B), who has coffee rewards points and wishes to acquire taco rewards points. Using the application on the customer device 110A, Customer A able to negotiate and agree on an exchange with Customer B, who is similarly using the application on the customer device 110B. In response to the two customers agreeing to exchange their respective virtual currencies, Merchant A (e.g., via merchant node 120A) may receive a transaction request from Customer A (e.g., from customer device 110A) to transfer the first virtual currency units (e.g., taco rewards points) from a customer account associated with the first customer device 110A to a customer account associated with the second customer device 110B. The first merchant node 120A may validate the request after Customer A signs the hash that has been appended with the public key of Customer B (e.g., Customer A's signature 326, based on Customer A's private key 318, may be appended to the hash 324 and the Customer B public key in order to authorize and validate the transfer of the first virtual currency). Similarly, Merchant B (e.g., via merchant node 120B) may receive a transaction request from Customer B (e.g., from customer device 110B) to transfer the second virtual currency units (e.g., coffee rewards points) from a customer account associated with the second customer device 110B to a customer account associated with the first customer device 110A. The second merchant node 120B may validate the request after Customer B signs the hash that has been appended with the public key of Customer A. After the respective merchant nodes 120A and 120B each validate the transaction request as described with respect to block 640 in FIG. 6, they each proceed to create and send a transaction receipt documenting movement of their respective virtual currency units to one or more unaffiliated merchant nodes, which may be selected at random (e.g., merchant node 120A sending its receipt to merchant nodes 120C and 120D and merchant node 120B sending its receipt to merchant nodes 120A and 120E-G). Once the transaction is complete, the two customers, via the application on their respective customer devices 110A and 110B, receive confirmation that the transaction was successful and can proceed to use their newly acquired virtual currency units. That is, Customer A can use customer device 110A to communicate with merchant node 120B, directly via network 140 or through merchant POS terminal 130B, to redeem second virtual currency units (e.g., coffee rewards) upon entering Merchant B's coffee shop.

One or more steps in this exemplary use case may be automated or facilitated by the system. For example, the system 100 (e.g., via merchant POS terminal 130B) may detect entry of customer device 110A within a range of Merchant B's POS location and communicate the detection to the merchant node 120B. In turn, the merchant node 120B may direct the customer device 110A to identify, via the application, whether the customer account associated with the customer device 110A has a sufficient balance of the second virtual currency units (e.g., coffee rewards points) to purchase any goods or one of Customer A's typical purchases at Merchant B. If there are insufficient merchant-specific virtual currency units on account, the system 100 (e.g., via merchant node 120B in communication with the application on the customer device 110A) may prompt Customer A with an option to exchange another type of virtual currency for the coffee rewards points. The system 100 (e.g., via merchant node 120B in communication with the application on the customer device 110A) may automatically determine a suggested amount of virtual currency units to acquire and/or a type and amount of other virtual currency units to trade in exchange based at least in part on Customer A's purchase history and/or user input from Customer A. Once the amount of the desired virtual currency has been identified along with the other virtual currency units available for trade, the system 100 (e.g., via merchant node 120B in communication with other merchant nodes on the system 100) may identify one or more customers to facilitate one or more transactions with to arrive at the desired total and prompt Customer A (e.g., via merchant node 120B in communication with the application on the customer device 110A) to select desired transaction(s)/customer(s) from the identified list.

To facilitate Customer A's transaction at Merchant B with an unlike virtual currency, it is possible for users of the system to set up an exchange system where each customer lists what currency they currently possess, the customer's target currency, and a stated exchange rate for exchanging virtual currency A for virtual currency B. Another customer (e.g., Customer B) may see Customer A's listing and agree to make the exchange, which may be immediately initiated or initiated following confirmation by each customer involved. Further, each customer may specify a list of "favorite" virtual currencies, which may be at least partially based on the customer's transaction history and/or the merchant node(s) 120 within a predetermined distance to the customer device 110. In some embodiments, Customer A may be able to directly transact with Customer B by looking up Customer B's public key (e.g., the public key 322) based on identifying information associated with Customer B's account (e.g., Customer B's email address, or other identifying information). This may be preferred when Customer A transfers virtual currency in return for a cash payment from Customer B or when Customer A wishes to gift Customer B some virtual currency.

In a second, but related exemplary use case in accordance with some embodiments, the first customer (Customer A) may have insufficient second virtual currency units (e.g., coffee rewards points), third virtual currency units (e.g., ice cream rewards points), etc. to conduct a direct A-for-B or A-and-C-for-B transaction with a second customer (Customer B) on the system 100. In such a scenario, the system 100 may (i) involve three or more customers or, separate from or in combination with transactions between the customers, (ii) utilize generic virtual currency units produced by the authorization node, or with an unaffiliated merchant node authorized by the authorization node 150. That is, Customer A (e.g., via customer device 110A) may trade first virtual currency units for generic virtual currency units as a separate transaction with the authorization node 150 or as part of a transaction with one or more other customers. For example, if Customer A has 1,000 coffee rewards points and 2,000 ice cream rewards points and wishes to obtain 1,500 taco rewards points, another customer who has 1,500 taco rewards points may not be interested in Customer A's coffee rewards points or ice cream rewards points (or the 1,000 coffee rewards points alone may be insufficient). To facilitate and expedite this transaction, the system 100 may (e.g., via authorization node in communication with customer device 110A) prompt Customer A with an option to exchange his 1,500 of the ice cream rewards points for 1,500 generic rewards points, which can in turn be exchanged for Customer B's 1,500 taco rewards points. When Customer A accepts, the transaction proceeds with the authorization node 150 in the same manner as it would with another customer (just first between Customer A and authorization node 150, then between Customer A and Customer B).

Utilizing virtual currency units may avoid the arduous task of a customer having to manually search for other customers to trade with or, if the system 100 automatically identifies customers, expedite the identification process and maximize the trade possibilities. As previously described herein, the authorization node 150, or its designee, may be exclusively capable of creating and issuing generic currency units within the system 100. By agreement among the merchant nodes and the authorization node, each type of virtual currency issued by a participating merchant node may be exchanged for a predetermined quantity of generic virtual currency according to an agreed-upon exchange rate. Alternatively, the exchange rate may be based on supply and demand, where there is a finite supply of generic currency (e.g., only a certain amount of virtual currency units may be generated by the authorization node 150). Exchange rates may be based on how many customers want the currencies being traded in. For example, Coffee Company currency may be more valuable than Quick Taco Stand currency if more people are redeeming their Coffee Company rewards.

Each merchant node 120 validates the transaction involving its own virtual currency, including the authorization node 150 (or merchant node authorized to act as the authorization node 150) validating the transaction of generic virtual currency. In some embodiments, the authorization node 150 may keep a reserve of all participating virtual currencies to facilitate exchanges of unlike virtual currencies, and in other embodiments the authorization node 150 may have an agreement in place with the various merchant nodes for the merchant nodes 120 to buy back their respective virtual currencies from the authorization node 150. This exemplary use case may also allow a customer, either manually or via the system 100, to better take advantage of exchange rates between various virtual currency types and the generic currency. In some embodiments, it is contemplated that generic currency units may be acquired from the authorization node 150, exclusively or non-exclusively, for cash or another currency type (including Bitcoin or another virtual currency) that serves as monetary tender outside of the system 100.

In a third exemplary use case in accordance with some embodiments, a customer may wish to redeem merchant-specific virtual currency at the respective merchant's POS location. For example, Customer A may wish to redeem coffee rewards points at Merchant B's coffee shop. In response to detecting (e.g., via GPS data from the customer device 110, beacons, RFID signals, local network connectivity, etc.) that the customer device 110 has entered a predetermined range of the merchant POS terminal 130B corresponding to the merchant node terminal 120B (and Merchant B), the merchant node terminal 120B (in communication with the application on the customer device 110A), the merchant node terminal 120 may prompt (e.g., via the application on the customer device 110A) the customer with the option to redeem his or her virtual currency points in exchange for a specific merchant reward, discount, etc. For example, at a participating coffee shop, the customer may be given the option to redeem her "100 coffee rewards points" for a free large latte. Alternatively, if the customer has less than the required number of "coffee points" for the free latte, the system 100 may instead prompt the customer that a discount proportional the number of virtual currency units the customer wishes to redeem (e.g., a 20% discount in return for redeeming 20 "coffee rewards points") may be available to apply to his or her purchase. Upon accepting an offer via the application on his or her customer device 110A, and sending a redemption request via the customer device 110A to merchant node 120B, the customer would complete a transaction with Merchant B as described herein.

In a fourth exemplary use case in accordance with some exemplary embodiments, a customer (e.g., Customer A) may wish to redeem virtual currency units (e.g., taco rewards points) associated with Merchant A at Merchant B's coffee shop. This may be accomplished by one of several ways. In response to detecting (e.g., via GPS data from the customer device 110, beacons, RFID signals, local network connectivity, etc.) that the customer device 110 has entered a predetermined range of the merchant POS terminal 130B corresponding to the merchant node terminal 120B (and Merchant B), the merchant node terminal 120B (in communication with the application on the customer device 110A), the merchant node terminal 120 may prompt (e.g., via the application on the customer device 110A) the customer with the option to redeem his or her virtual currency points in exchange for a specific merchant reward, discount, etc. For example, the system 100 (e.g., via the merchant node 120 in communication with the application on the customer device 110A) may identify that the customer account associated with the customer device 110A does not have any coffee shop rewards associated with Merchant B, but does have 1,000 taco rewards points associated with Merchant A and 1,500 ice cream rewards points associated with Merchant C. The system 100 (e.g., via the merchant node 120) may have one or more stored rules regarding other virtual currencies that Merchant B accepts and, for this example, taco rewards points associated with Merchant A and generic rewards points are accepted while ice cream rewards points associated with Merchant C are not. As described with respect to other exemplary use cases, the system 100 (e.g., via the merchant node terminal 120 in communication with the application on the customer device 110A) may then prompt the customer (e.g., via the customer device 110A) to exchange some of his or her 1,000 taco rewards points for a manually inputted or system suggested amount of coffee rewards points to be redeemed at Merchant B's coffee shop, and complete the transaction after the customer accepts. Following the exchange, the customer may redeem his or her newly acquired coffee rewards points via merchant POS terminal 130B and/or merchant node 120B as previously described. Separately, the merchant node 120B may exchange the customer-redeemed taco rewards points in exchange for, at pre-agreed exchange rates, (i) Merchant B's own coffee rewards points in possession of the merchant terminal 120A associated with Merchant A and/or (ii) generic virtual currency rewards points in possession of the merchant terminal 120A associated with Merchant A.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A first merchant node on a semi-private blockchain virtual currency exchange system, the first merchant node being associated with a first merchant and comprising:
   one or more processors; and
   a memory in communication with the one or more processors and storing instructions that, when executed by the one or more processors, are configured to cause the first merchant node to:
   create a plurality of first virtual currency units;
   issue, by applying a first merchant digital signature to a cryptographic hash of a previous transaction combined with a first customer public key, one or more first virtual currency units to a first customer account associated with a first customer computing device of a plurality of customer computing devices within the semi-private blockchain virtual currency exchange system, wherein the plurality of customer computing devices are respectively associated with a plurality of customers and each of the plurality of customer computing devices is incapable of creating any type of virtual currency units within the system;
   receive a first transaction request for exchanging one or more of the first virtual currency units for a second currency type between the first customer account and a second customer account associated with a second customer computing device of the plurality of customer computing devices within the system, wherein the second currency type is created by one or more second merchant nodes associated with a second merchant on the semi-private blockchain virtual currency exchange system;
   validate the first transaction request by validating a transaction history associated with the plurality of first virtual currency units being requested, the transaction history comprising one of a first customer digital signature or a first merchant digital signature;
   create a first transaction receipt after the first transaction request has been validated;
   send the first transaction receipt to one or more of the second merchant nodes for storage to record the first transaction receipt within the system;
   detect a presence of a respective computing device selected from the first customer computing device, the second customer computing device, and a third customer computing device within a predetermined area by receiving GPS data from the respective computing device, receiving an RFID signal from the respective computing device, the respective computing device connecting to a local network associated with a point-of-sale (POS) terminal associated with the first merchant, or combinations thereof;
   prompt the respective computing device to generate a first redemption request;
   receive, based on the prompt and from the point-of-sale (POS) terminal associated with the first merchant, the first redemption request to redeem one or more of the first virtual currency units from one of the first customer account, the second customer account, or a third customer account associated with the third customer computing device of the plurality of customer computing devices within the system;
   validate the first redemption request by validating a transaction history associated with the plurality of first virtual currency units being redeemed, the transaction history comprising one of the first customer digital signature, the first merchant digital signature, a second customer digital signature, or a third customer digital signature;
   create a first redemption receipt after the first redemption request has been validated; and
   send the first redemption receipt to one or more of the second merchant nodes for storage to record the first redemption receipt within the system,
   wherein the first merchant node is a first node among one or more first nodes on the semi-private blockchain virtual currency exchange system, wherein the one or more first nodes are associated with the first merchant and exclusively create the first virtual currency units within the semi-private blockchain virtual currency exchange system.

2. The first merchant node of claim 1, further comprising:
   acquiring the first customer's digital signature for validation; and
   acquiring the cryptographic hash of the previous transaction that can be combined with the first customer public key,
   wherein the first virtual currency comprises rewards credits that are exclusively redeemable from the first merchant.

3. The first merchant node of claim 2, wherein the second currency type comprises one or more second virtual currency units that are exclusively created by a second merchant node of the one or more second merchant nodes.

4. The first merchant node of claim 3, wherein the one or more second virtual currency units comprises rewards credits that are exclusively redeemable from the second merchant, the second merchant being different from the first merchant.

5. The first merchant node of claim 1, wherein an issuance of one or more of the first virtual currency units to the first customer account comprises:
   validating the issuance;
   creating an issuance receipt after the issuance has been validated;
   sending the issuance receipt to one or more of the second merchant nodes for storage to record the issuance receipt within the system.

6. The first merchant node of claim 1, wherein issuing one or more of the first virtual currency units to the first customer account comprises:
   receiving a virtual currency issue request for the first customer account when the first customer computing device is located proximate the POS terminal associated with the first merchant;
   issuing one or more of the first virtual currency units to the first customer account while the first customer computing device is located proximate the POS terminal.

7. The first merchant node of claim 1, wherein sending the first transaction receipt to one or more of the second merchant nodes comprises sending the first transaction receipt to a first plurality of the second merchant nodes, and sending the first redemption receipt to one or more of the second merchant nodes comprises sending the first transaction receipt to a second plurality of the second merchant nodes that differs from the first plurality of the second merchant nodes.

8. The first merchant node of claim 1, wherein validating the first transaction comprises:
   receiving a notification of successful verification by the first customer computing device based on a first customer public key associated with the first customer computing device and a first customer private key known only to the first customer computing device;
   validating a purported first merchant digital signature on the transaction history based on a first merchant private key known only to the first merchant node and associated with a first merchant public key, the first merchant digital signature being generated based on the first merchant private key;
   validating the first transaction based on the received notification and the validation of the purported first merchant digital signature.

9. The first merchant node of claim 1, wherein the instructions are further configured to cause the first merchant node to:
   receive a second transaction request from one or more of the second merchant nodes for exchanging one or more of the first virtual currency units for second currency type between the first customer account and the second customer account associated with the second customer computing device of the plurality of customer computing devices within the system;
   validate the second transaction request;
   create a second transaction receipt after the second transaction request has been validated; and
   send the second transaction receipt to one or more of the second merchant nodes for storage to record the second transaction receipt within the system.

10. A first merchant system for operation within a semi-private blockchain virtual currency exchange system, the first merchant system comprising:
   one or more first merchant nodes comprising one or more first processors;
   a point-of-sale (POS) terminal comprising one or more POS terminal processors; and
   one or more memories in communication with the one or more first processors and the one or more POS terminal processors and storing instructions that, when executed by the one or more first processors and one or more POS terminal processors, are configured to cause the first merchant system to:
      generate, by the one or more first processors, a plurality of first virtual currency units, the first merchant node being associated with a first merchant, wherein the one or more first merchant nodes exclusively generate the first virtual currency units;
      issue, by the one or more first processors by applying a first merchant digital signature to a cryptographic hash of a previous transaction combined with a first customer public key, one or more of the first virtual currency units to a first customer account associated with a first customer computing device of a plurality of customer computing devices within the system, wherein the plurality of customer computing devices are respectively associated with a plurality of customers and each of the plurality of customer computing devices is incapable of generating first virtual currency units or second virtual currency units;
      receive, at the one or more first processors, a first transaction request for transferring one or more of first virtual currency units from the first customer account to a second customer account associated with a second customer computing device of the plurality of customer computing devices within the semi-private blockchain virtual currency exchange system;
      validate, at the one or more first processors, the first transaction request by validating a transaction history associated with the plurality of first virtual currency units being requested, the transaction history comprising one of a first customer digital signature or a first merchant digital signature;
      generate, at the one or more first processors, a first transaction receipt after the first transaction request has been validated;
      transmit the first transaction receipt to one or more second merchant nodes on the system for storage to update a record of first virtual currency transactions within the system, the one or more second merchant nodes being associated with a second merchant and capable of creating one or more of the second virtual currency units;
      receive, at the one or more first processors, a second transaction request for a second transaction transferring one or more of first virtual currency units from the second customer account to a third customer account associated with a third customer computing device of the plurality of customer computing devices within the system;
      validate, at the one or more first processors, the second transaction request by validating a transaction history associated with the plurality of first virtual currency units being requested, the transaction history comprising one of the first customer digital signature, a second customer digital signature, or the first merchant digital signature;
      generate, at the one or more first processors, a second transaction receipt after the second transaction request has been validated;

transmit the second transaction receipt to the one or more second merchant nodes on the system for storage to update a record of second virtual currency transactions within the system;

detect a presence of a respective computing device selected from the first customer computing device, the second customer computing device, and the third customer computing device within a predetermined area, by receiving GPS data from the respective computing device, receiving an RFID signal from the respective computing device, the respective computing device connecting to a local network associated with a point-of-sale (POS) terminal associated with the first merchant, or combinations thereof;

prompt the respective computing device to generate a first redemption request;

receive, responsive to the prompt and at one or more POS terminal processors of the POS terminal, a first redemption request to redeem one or more of the first virtual currency units from one of the first customer account, the second customer account, or the third customer account, wherein the POS terminal is associated with the first merchant;

validate, at the one or more first processors, the first redemption request by validating a transaction history associated with the plurality of first virtual currency units being redeemed, the transaction history comprising one of the first customer digital signature, the second customer digital signature, a third customer digital signature, or the first merchant digital signature;

generate, at the one or more first processors, a first redemption receipt after the first redemption request has been validated; and transmit the first redemption receipt to at least the one or more second merchant nodes on the system for storage to update a record of first virtual currency redemptions within the system.

11. The system of claim 10, wherein the second merchant is different from the first merchant and the one or more second merchant nodes being exclusively capable of creating the second virtual currency units within the system.

12. The system of claim 10, wherein an issuance request of one or more of the first virtual currency units to the first customer account comprises:

validating, at the first merchant node, the issuance request;

generating, at the first merchant node, an issuance receipt after the issuance request has been validated;

sending the issuance receipt to the one or more second merchant nodes on the system for storage to update the record of first virtual currency transactions within the system.

13. The system of claim 10, wherein validating the first transaction comprises:

receiving, by the one or more first processors, a notification of successful verification by the first customer computing device based on a first customer public key associated with the first customer computing device and a first customer private key known only to the first customer computing device;

validating, by the one or more first processors, a purported first merchant digital signature on the transaction history based on a first merchant private key known only to the one or more first merchant nodes and associated with a first merchant public key, the first merchant digital signature being generated based on the first merchant private key;

validating the first transaction based on the received notification and the validation of the purported first merchant digital signature.

14. The system of claim 10, wherein the instructions are further configured to cause the system to receive, at the one or more first processors, a third transaction receipt from the one or more second merchant nodes for storage to update a record of third virtual currency transactions within the system.

15. A first merchant node on a semi-private blockchain virtual currency exchange system, the first merchant node being associated with a first merchant and comprising:

one or more processors; and a memory in communication with the one or more processors and storing instructions that, when executed by the one or more processors, are configured to cause the first merchant node to:

create a plurality of first virtual currency units, wherein the first merchant node exclusively creates the first virtual currency units within the system;

issue one or more of the first virtual currency units to one or more of a plurality of customer accounts each associated with one of a plurality of customer computing devices within the system;

create an issuance receipt after the first virtual currency units have been issued;

send the issuance receipt to a randomly-identified subset of a plurality of second merchant nodes for storage to record the issuance receipt within the system, the plurality of second merchant nodes being unassociated with the first merchant and incapable of creating the first virtual currency units within the system;

receive one or more transaction requests for transferring one or more of first virtual currency units between two or more of the customer accounts;

validate each of the transaction requests by validating each transaction history associated with the plurality of first virtual currency units being requested, wherein the transaction history comprises one or more digital signatures associated with each previous first currency holders;

create a transaction receipt after each of the transaction requests has been validated;

send each of the transaction receipts to a first randomly-identified subset of the plurality of second merchant nodes for storage to record the transaction receipts within the system;

detect a presence of a respective computing device selected from one of the plurality of customer computing devices within a predetermined area, by receiving GPS data from the respective computing device, receiving an RFID signal from the respective computing device, the respective computing device connecting to a local network associated with a point-of-sale (POS) terminal associated with the first merchant, or combinations thereof;

prompt the respective computing device to generate a first redemption request;

receive, responsive to the prompt and from the point-of-sale (POS) terminal associated with the first merchant, one or more redemption requests to redeem one or more of the first virtual currency units from one of the customer accounts;

validate each of the redemption requests by validating a transaction history associated with the plurality of first virtual currency units being redeemed, wherein the transaction history comprises one or more digital signatures associated with each previous first currency holders;

create a redemption receipt after the redemption request has been validated; and send the redemption receipt to a second randomly-identified subset of the plurality of second merchant nodes for storage to record the redemption receipt within the system.

16. The first merchant node of claim 15, wherein at least a portion of the first virtual currency units comprises rewards credits that are exclusively redeemable from the first merchant via the first merchant node.

17. The first merchant node of claim 15, wherein the plurality of second merchant nodes comprises a second merchant node and a third merchant node, the second merchant node being exclusively capable of creating and redeeming second virtual currency units within the system and the third merchant node being exclusively capable of creating and redeeming third virtual currency units within the system.

18. The first merchant node of claim 15, wherein the instructions are further configured to cause the first merchant node to randomly identify the first subset of the plurality of second merchant nodes and identify the second subset of the plurality of second merchant nodes, the first subset differing from the second subset.

19. The first merchant node of claim 15, further comprising the point-of-sale (POS) terminal providing an interface for issuing and redeeming one or more of the first virtual currency units.

* * * * *